US012697902B2

(12) United States Patent
Ogaki et al.

(10) Patent No.: US 12,697,902 B2
(45) Date of Patent: Aug. 4, 2026

(54) CONTROL METHOD, CONTROL DEVICE, AND VEHICLE

(71) Applicant: HONDA MOTOR CO., LTD., Tokyo (JP)

(72) Inventors: Toru Ogaki, Tokyo (JP); Shizuki Kino, Tokyo (JP); Yuki Tani, Tokyo (JP); Kazuya Kurahashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 92 days.

(21) Appl. No.: 18/591,774

(22) Filed: Feb. 29, 2024

(65) Prior Publication Data

US 2024/0326653 A1     Oct. 3, 2024

(30) Foreign Application Priority Data

Mar. 28, 2023     (JP) ................................. 2023-052090

(51) Int. Cl.
B60L 58/27         (2019.01)
B60H 1/00          (2006.01)
                       (Continued)

(52) U.S. Cl.
CPC .......... B60L 58/27 (2019.02); B60H 1/00278 (2013.01); B60H 1/00878 (2013.01);
                       (Continued)

(58) Field of Classification Search
CPC ...... B60L 58/27; B60L 2240/545; B60L 1/02; B60L 2240/662; B60L 58/26;
                       (Continued)

(56) References Cited

U.S. PATENT DOCUMENTS

2014/0374081 A1     12/2014     Kakehashi et al.
2015/0000327 A1     1/2015      Kakehashi et al.
                       (Continued)

FOREIGN PATENT DOCUMENTS

JP         2013-230805 A       11/2013
JP         2019-215139 A       12/2019
                       (Continued)

OTHER PUBLICATIONS

JP2020013726 english translation (Year: 2020).*
Apr. 2, 2024, Translation of Japanese Office Action issued for related JP Application No. 2023-052090.

*Primary Examiner* — Anne Marie Antonucci
*Assistant Examiner* — Nicholas Patrick Langhorne
(74) *Attorney, Agent, or Firm* — Paratus Law Group, PLLC

(57)     ABSTRACT

In a case where a battery is scheduled to be charged at charging equipment included in a scheduled travel route of a vehicle, a preheating control for heating the battery by the heating device is executed before the vehicle arrives at the charging equipment such that a temperature of the battery when the vehicle arrives at the charging equipment reaches a predetermined target temperature, and in response to a temperature of the battery reaching a predetermined waste heat recovery temperature, a waste heat recovery control for enabling an air conditioner to execute heating using waste heat of the battery is executed. In response to a current temperature of the battery being higher than the waste heat recovery temperature and the target temperature being higher than the waste heat recovery temperature, executing the preheating control while restricting execution of the waste heat recovery control.

10 Claims, 8 Drawing Sheets

| CONTROL PATTERN | TEMPERATURE RELATIONSHIP | NOTIFICATION TO USER | CONTROL CONTENT (BEHAVIOR) |
|---|---|---|---|
| N1 | Ttar>Theat>Tbat | NO | EXECUTE PREHEATING CONTROL |
| N2 | Ttar>Tbat>Theat | YES | WHEN IT IS SELECTED TO EXECUTE PREHEATING CONTROL: EXECUTE PREHEATING CONTROL<br>WHEN IT IS SELECTED NOT TO EXECUTE PREHEATING CONTROL: EXECUTE WASTE HEAT RECOVERY CONTROL |
| N3 | Tbat>Ttar>Theat | YES | WHEN IT IS SELECTED TO EXECUTE PREHEATING CONTROL: EXECUTE PREHEATING CONTROL<br>WHEN IT IS SELECTED NOT TO EXECUTE PREHEATING CONTROL: EXECUTE WASTE HEAT RECOVERY CONTROL |
| N4 | Theat>Ttar>Tbat | NO | EXECUTE PREHEATING CONTROL |
| N5 | Theat>Tbat>Ttar | NO | EXECUTE PREHEATING CONTROL |
| N6 | Tbat>Theat>Ttar | YES | WHEN IT IS SELECTED TO EXECUTE PREHEATING CONTROL: EXECUTE PREHEATING CONTROL AFTER EXECUTING WASTE HEAT RECOVERY CONTROL<br>WHEN IT IS SELECTED NOT TO EXECUTE PREHEATING CONTROL: EXECUTE ONLY WASTE HEAT RECOVERY CONTROL |

Tbat: BATTERY TEMPERATURE
Ttar: TARGET TEMPERATURE OF PREHEATING CONTROL
Theat: WASTE HEAT RECOVERY TEMPERATURE

(51) Int. Cl.
  *B60H 1/14* (2006.01)
  *G07C 5/08* (2006.01)
(52) U.S. Cl.
  CPC .......... *B60H 1/00385* (2013.01); *B60H 1/143*
    (2013.01); *B60L 2240/545* (2013.01); *G07C*
    *5/0816* (2013.01)
(58) Field of Classification Search
  CPC ............ B60H 1/00278; B60H 1/00878; B60H
    2001/00307; B60H 1/00392; B60H
    1/00385; B60H 1/143; G07C 5/0816
  See application file for complete search history.

(56) References Cited

U.S. PATENT DOCUMENTS

| | | | |
|---|---|---|---|
| 2015/0202986 A1* | 7/2015 | Hatakeyama ............ | B60H 1/32 |
| | | | 165/287 |
| 2018/0142936 A1 | 5/2018 | Kakehashi et al. | |
| 2020/0023750 A1 | 1/2020 | Fukami et al. | |
| 2021/0331554 A1* | 10/2021 | Mancini ............. | B60H 1/00278 |
| 2022/0325930 A1* | 10/2022 | Day ................... | B60H 1/00907 |
| 2023/0038012 A1* | 2/2023 | Erozlu ............... | G01C 21/3679 |

FOREIGN PATENT DOCUMENTS

| | | | | |
|---|---|---|---|---|
| JP | 2020-014301 A | 1/2020 | | |
| JP | 2020013726 A | * 1/2020 | ............. | B60L 58/27 |

* cited by examiner

[BATTERY-HEAT ABSORPTION MODE]

[OUTSIDE-AIR-HEAT ABSORPTION MODE]

*FIG. 8*

| CONTROL PATTERN | TEMPERATURE RELATIONSHIP | NOTIFICATION TO USER | CONTROL CONTENT (BEHAVIOR) |
|---|---|---|---|
| N1 | Ttar>Theat>Tbat | NO | EXECUTE PREHEATING CONTROL |
| N2 | Ttar>Tbat>Theat | YES | WHEN IT IS SELECTED TO EXECUTE PREHEATING CONTROL: EXECUTE PREHEATING CONTROL<br>WHEN IT IS SELECTED NOT TO EXECUTE PREHEATING CONTROL: EXECUTE WASTE HEAT RECOVERY CONTROL |
| N3 | Tbat>Ttar>Theat | YES | WHEN IT IS SELECTED TO EXECUTE PREHEATING CONTROL: EXECUTE PREHEATING CONTROL<br>WHEN IT IS SELECTED NOT TO EXECUTE PREHEATING CONTROL: EXECUTE WASTE HEAT RECOVERY CONTROL |
| N4 | Theat>Ttar>Tbat | NO | EXECUTE PREHEATING CONTROL |
| N5 | Theat>Tbat>Ttar | NO | EXECUTE PREHEATING CONTROL |
| N6 | Tbat>Theat>Ttar | YES | WHEN IT IS SELECTED TO EXECUTE PREHEATING CONTROL: EXECUTE PREHEATING CONTROL AFTER EXECUTING WASTE HEAT RECOVERY CONTROL<br>WHEN IT IS SELECTED NOT TO EXECUTE PREHEATING CONTROL: EXECUTE ONLY WASTE HEAT RECOVERY CONTROL |

Tbat: BATTERY TEMPERATURE
Ttar: TARGET TEMPERATURE OF PREHEATING CONTROL
Theat: WASTE HEAT RECOVERY TEMPERATURE

CONTROL METHOD, CONTROL DEVICE, AND VEHICLE

This application is based upon and claims the benefit of priority from prior Japanese patent application No. 2023-52090, filed on Mar. 28, 2023, the entire contents of which are incorporated herein by reference.

TECHNICAL FIELD

The present disclosure relates to a control method, a control device, and a vehicle.

BACKGROUND ART

In recent years, as a specific countermeasure against global climate change, efforts for realizing a low-carbon society or a decarbonized society have become active. Also, in a vehicle such as an automobile, a reduction in $CO_2$ emissions and an improvement in energy efficiency are required, and electrification of a drive source is progressing. For example, an electric automobile provided with a motor (also referred to as a "traction motor") as a drive source that drives drive wheels, and a battery as a power supply that supplies power to the motor is developed.

When the battery is charged, the battery is desired to have an appropriate temperature. For example, JP2020-014301A below discloses a technique in which, when it is determined that it is necessary to charge a battery at a reachable charging station, a preliminary temperature adjustment process of operating a battery temperature adjustment unit is executed such that a temperature of the battery at a time point when an electric vehicle arrives at the reachable charging station is within a predetermined charging corresponding temperature range.

In addition, JP2013-230805A below discloses a technique in which cooling water absorbs heat from a battery in a battery cooler, and the cooling water that absorbs heat from the battery heats air to be blown into a passenger compartment in a heater core, so that waste heat of the battery can be recovered and used for heating the passenger compartment.

SUMMARY

There has been room for improvement from the viewpoint of preventing an increase in a charging time of a battery at charging equipment while improving energy efficiency of a vehicle.

Aspects of the present disclosure relates to providing a control method, a control device, and a vehicle capable of preventing an increase in a charging time of a battery at charging equipment while improving energy efficiency of a vehicle.

According to an aspect of the present disclosure, there is provided a control method of a vehicle, the vehicle including a battery, a heating device configured to heat the battery, and an air conditioner configured to heat a passenger compartment using waste heat of the battery, the control method executed by a computer, to control the vehicle, configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and a waste heat recovery control for enabling, in response to a temperature of the battery reaching a predetermined waste heat recovery temperature, the air conditioner to execute heating using the waste heat of the battery, the control method including:

in response to a current temperature of the battery being higher than the waste heat recovery temperature and the target temperature being higher than the waste heat recovery temperature, executing the preheating control while restricting execution of the waste heat recovery control.

According to another aspect of the present disclosure, there is provided a control device for controlling a vehicle, the vehicle including a battery, a heating device configured to heat the battery, and an air conditioner configured to heat a passenger compartment using waste heat of the battery, in which the control device is configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and execute a waste heat recovery control for enabling, in response to a temperature of the battery reaching a predetermined waste heat recovery temperature, the air conditioner to execute heating using the waste heat of the battery, and, in response to a current temperature of the battery being higher than the waste heat recovery temperature and the target temperature being higher than the waste heat recovery temperature, the control device executes the preheating control while restricting execution of the waste heat recovery control.

According to another aspect of the present disclosure, there is provided a vehicle including:

a battery;

a heating device configured to heat the battery;

an air conditioner configured to heat a passenger compartment using waste heat of the battery; and a control device configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and execute a waste heat recovery control for enabling, in a response to a temperature of the battery reaching a predetermined waste heat recovery temperature, the air conditioner to execute heating using the waste heat of the battery, in which, in response to a current temperature of the battery being higher than the waste heat recovery temperature and the target temperature being higher than the waste heat recovery temperature, the control device executes the preheating control while restricting execution of the waste heat recovery control.

According to aspects of the present disclosure, it is possible to prevent an increase in a charging time of a battery at charging equipment while improving energy efficiency of a vehicle.

BRIEF DESCRIPTION OF DRAWINGS

Exemplary embodiment(s) of the present invention will be described in detail based on the following figures, wherein:

FIG. 8 is a diagram showing an example of a control pattern executable by the control device CTR.

DESCRIPTION OF EMBODIMENTS

Figure 1:
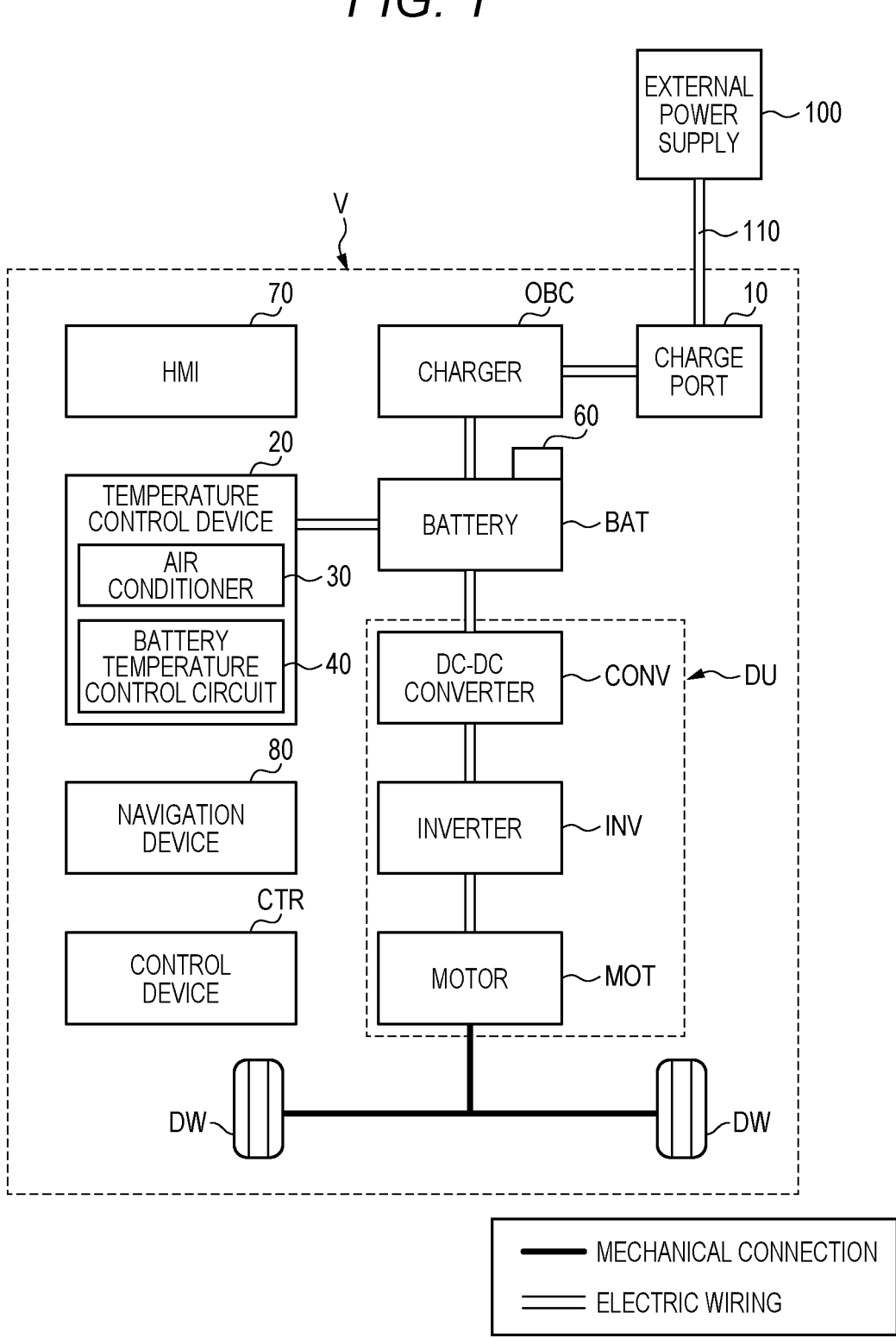
FIG. 1 is a block diagram showing an example of a schematic configuration of a vehicle V.

Hereinafter, an embodiment of a control method, a control device, and a vehicle according to the present disclosure will be described in detail with reference to the drawings. In the following description, front and rear, left and right, and up and down are described according to directions viewed from an occupant (for example, a driver) of a vehicle. The drawings are viewed from directions of reference numerals. The following embodiment does not limit the disclosure described in the claims, and not all combinations of features described in the embodiment are essential to the disclosure. Two or more of a plurality of features described in the embodiment may be combined freely. Hereinafter, the same or similar elements are denoted by the same or similar reference numerals, and the description thereof may be omitted or simplified as appropriate.

(Vehicle)

A vehicle V in the present embodiment is, for example, an electric vehicle such as a plug-in hybrid vehicle or an electric automobile, includes a battery BAT that is chargeable with power from an external power supply 100 provided in a charging station, a home, or the like as shown in FIG. 1, and is capable of traveling by the power stored in the battery BAT. In FIG. 1, a thick solid line indicates mechanical connection, and a double line indicates electric wiring. In addition, the configuration shown in FIG. 1 is an example, and a part of the configuration may be omitted, or another configuration may be added.

The battery BAT is implemented by stacking a plurality of battery cells (not shown), and is, for example, a lithium ion battery or a nickel hydrogen battery. The battery BAT is provided with a temperature sensor 60 that detects a current temperature of the battery BAT (hereinafter, also referred to as a "battery temperature Tbat"). The temperature sensor 60 outputs a detection signal indicating the detected battery temperature Tbat to a control device CTR to be described later. Accordingly, the control device CTR may acquire the battery temperature Tbat detected by the temperature sensor 60.

The vehicle V is provided with a charge port 10 and a charger OBC (on-board charger) disposed between the charge port 10 and the battery BAT. When a charge plug of a charge cable 110 of the external power supply 100 is connected (plugged in) to the charge port 10, the charger OBC converts a current introduced from the external power supply 100 via the charge port 10, for example, an AC current during normal charge into a DC current, and outputs the converted DC current to the battery BAT. In this way, the battery BAT stores power supplied from the external power supply 100. The configuration for charging the battery BAT by the external power supply 100 is not limited thereto. For example, the battery BAT may be charged by a configuration in which a power receiving coil or the like capable of receiving, in a non-contact manner, power transmitted from the external power supply 100 is provided in the vehicle V.

The vehicle V includes a drive unit DU, a temperature control device 20, the control device CTR, and a human machine interface (HMI) 70.

The drive unit DU includes a DC-DC converter CONV, an inverter INV, and a motor MOT. The DC-DC converter CONV boosts power supplied from the battery BAT and outputs the boosted power to the inverter INV. The inverter INV converts a DC current supplied from the DC-DC converter CONV into an AC current and outputs the AC current to the motor MOT. The motor MOT is, for example, a three-phase AC motor, and is driven by power supplied from the battery BAT via the DC-DC converter CONV and the inverter INV. An output of the motor MOT is transmitted to drive wheels DW of the vehicle V, and thus the vehicle V travels.

The HMI 70 presents various types of information to an occupant (hereinafter, also referred to as a "user") of the vehicle V and receives an input operation by the user. The HMI 70 may be, for example, a touch panel display device implemented by a liquid crystal display, an organic electro luminescence diode (OELD) display, or the like. For example, a selection screen G to be described later with reference to FIG. 7 may be displayed on the HMI 70. The HMI 70 may further include a speaker, a buzzer, a switch, a key, and the like in addition to the display device.

A navigation device 80 includes, for example, a global navigation satellite system (GNSS) receiver capable of specifying a current position of the vehicle V, and determines, with reference to map data or the like stored in advance, a route (hereinafter, also referred to as a "guidance route") from the current position specified by the GNSS receiver to a destination set by the user. At this time, for example, when it is predicted that a remaining capacity (hereinafter, also referred to as "state of charge (SOC)") of the battery BAT is equal to or less than a predetermined value on the way to the destination, the navigation device 80 determines a guidance route including, as a through point, charging equipment (for example, a so-called charging station) capable of charging the battery BAT.

When the guidance route is determined, the navigation device 80 displays the determined guidance route on a display device such as the HMI 70 to guide the user. Accordingly, the vehicle V may travel along the guidance route. That is, the guidance route is a route along which the vehicle V is scheduled to travel (hereinafter, also referred to as a "scheduled travel route"). The navigation device 80 outputs information indicating the determined guidance route, that is, the scheduled travel route, to the control device CTR to be described later. Accordingly, the control device CTR may acquire the information indicating the scheduled travel route of the vehicle V, and may execute a control according to the scheduled travel route. For example, when the charging equipment is included as the through point in the scheduled travel route of the vehicle V, the control device CTR may determine that the battery BAT is scheduled to be charged at the charging equipment and execute a preheating control to be described later.

The control device CTR is a computer that controls the entire vehicle V including the charger OBC, the battery BAT, the drive unit DU, the temperature control device 20, and the HMI 70. In addition, the control device CTR also controls a battery heater ECH1 and a heating heater ECH2 to be described later. The control device CTR is implemented by, for example, an electronic control unit (ECU) including a processor, a memory, an interface, and the like. The control device CTR may be implemented by a plurality of control devices (for example, ECUs), that is, the control device may be provided for each of the above control objects.

(Temperature Control Device)

Figure 2:
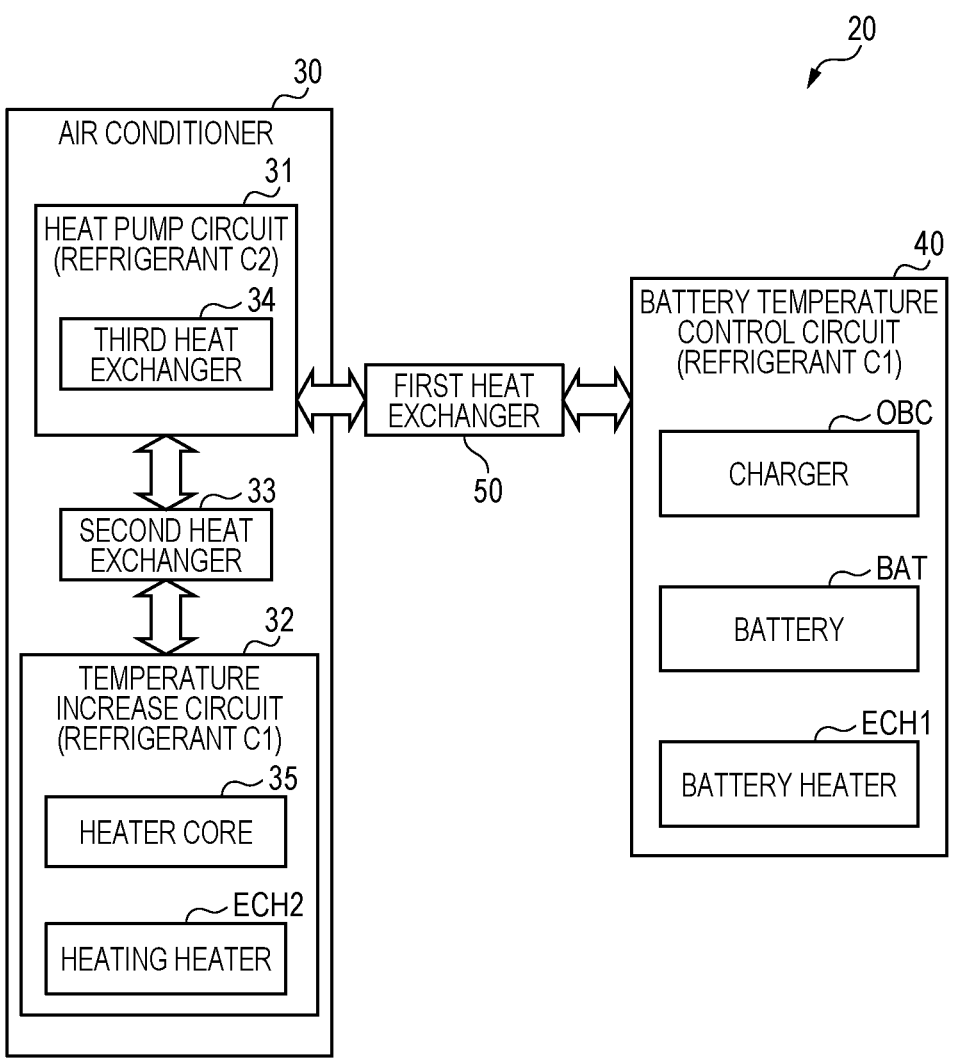
FIG. 2 is a diagram showing a configuration of a temperature control device 20.

As shown in FIG. 2, the temperature control device 20 includes an air conditioner 30 that performs heating, cooling, or the like of a passenger compartment, a battery temperature control circuit 40 that heats or cools the battery BAT, and a first heat exchanger 50 that performs heat exchange between a heat pump circuit 31 of the air conditioner 30 and the battery temperature control circuit 40. The battery temperature control circuit 40 is an example of a heating device capable of heating the battery BAT.

(Battery Temperature Control Circuit)

A liquid refrigerant C1 (for example, water) circulates inside the battery temperature control circuit 40, and heat exchange is performed between the battery BAT and the charger OBC.

Figure 3:
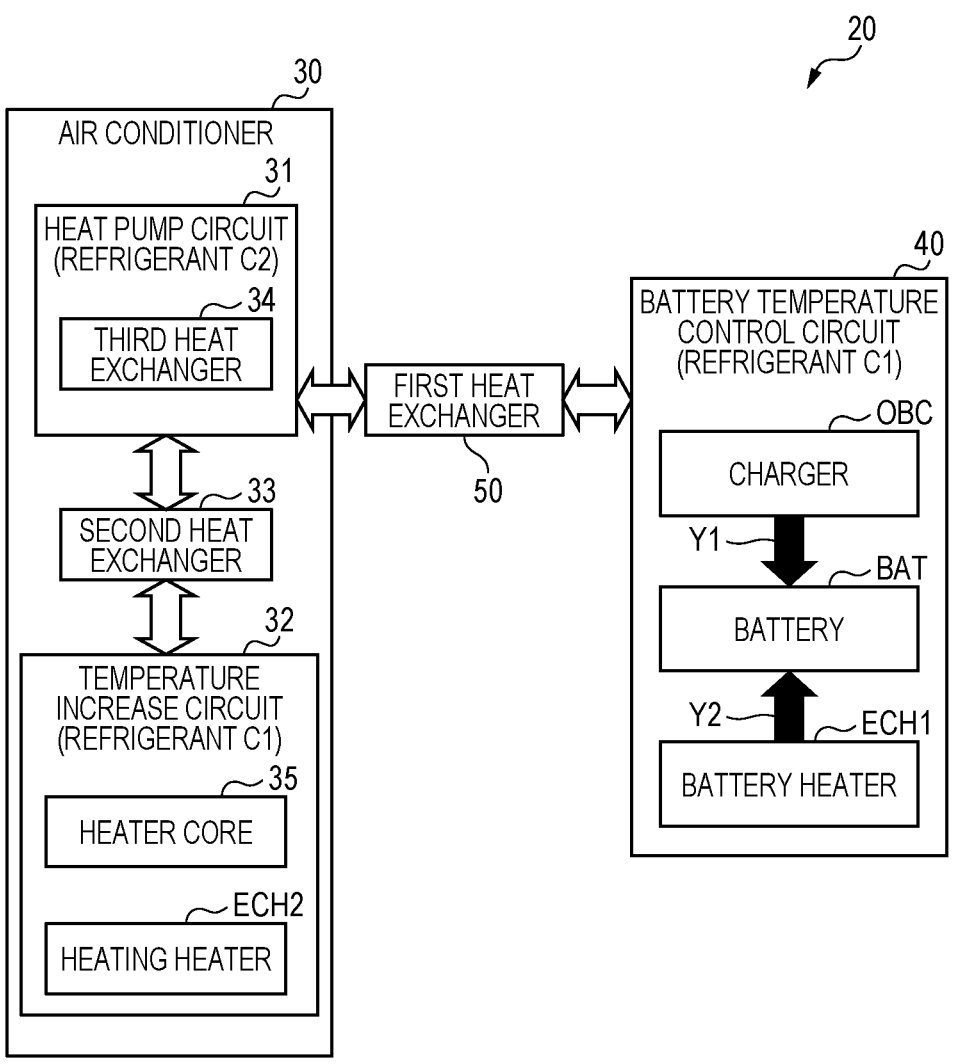
FIG. 3 is a diagram showing a flow of heat stored in a battery BAT before heating a passenger compartment.

Specifically, in the battery temperature control circuit 40, when the battery BAT is charged with the power from the external power supply 100 before the start of the vehicle V, the charger OBC generates heat and has a high temperature. The charger OBC performs heat exchange with the refrigerant C1 flowing through the battery temperature control circuit 40, the charger OBC is cooled down, and the refrigerant C1 is heated. The heated refrigerant C1 circulates through the battery temperature control circuit 40 to perform heat exchange with the battery BAT, thereby heating the battery BAT. A black arrow Y1 shown in FIG. 3 indicates transfer of heat from the charger OBC to the battery BAT. In this way, the battery BAT stores heat from the charger OBC via the refrigerant C1 when being charged by the external power supply 100.

The battery temperature control circuit 40 is provided with the battery heater ECH1. The battery heater ECH1 is, for example, an electric heater (electric coolant heater), and operates by the power from the external power supply 100 when connected to the external power supply 100, and operates by the power from the battery BAT when not connected to the external power supply 100. Specifically, the refrigerant C1 is heated by the battery heater ECH1, and the heated refrigerant C1 performs the heat exchange with the battery BAT to heat the battery BAT. A black arrow Y2 shown in FIG. 3 indicates transfer of heat from the battery heater ECH1 to the battery BAT. In this way, the battery BAT stores the heat from the battery heater ECH1 via the refrigerant C1.

Further, the battery BAT generates heat by itself when being charged by the external power supply 100, and stores the heat generated by itself.

The battery BAT has a large thermal capacity and easily stores heat, and thus as described above, the charge plug coupled to the external power supply 100 is connected to the vehicle V after the use of the vehicle V until the next use of the vehicle V to charge the battery BAT, so that the heat from the charger OBC, the heat from the battery heater ECH1, and the heat generated by the battery BAT itself are stored in the battery BAT.

(Air Conditioner)

The air conditioner 30 includes the heat pump circuit 31, a temperature increase circuit 32, and a second heat exchanger 33 that performs heat exchange between the heat pump circuit 31 and the temperature increase circuit 32. The heat pump circuit 31 includes a refrigeration cycle including a compressor, a condenser, an expansion valve, an evaporator, and the like, and a liquid refrigerant C2 (for example, an air-conditioning refrigerant) flows therein. The condenser (hereinafter, referred to as a third heat exchanger 34) of the heat pump circuit 31 is exposed to outside air, and is capable of absorbing heat (that is, heat-pumping) from the outside air under a low-temperature environment when heating the passenger compartment. A black arrow Y3 shown in FIGS. 4 and 5 indicates transfer of heat from the outside air to the third heat exchanger 34.

The liquid refrigerant C1 (for example, water) flows inside the temperature increase circuit 32. The refrigerant in the temperature increase circuit 32 and the refrigerant in the battery temperature control circuit 40 are both the refrigerant C1 and are common. The refrigerant C1 in the temperature increase circuit 32 performs heat exchange with the refrigerant C2 in the heat pump circuit 31 via the second heat exchanger 33, and thus a temperature thereof is increased. A black arrow Y4 shown in FIGS. 4 and 5 indicates transfer of heat from the third heat exchanger 34 to the temperature increase circuit 32 via the second heat exchanger 33.

The heating heater ECH2 is provided in the temperature increase circuit 32, and the temperature of the refrigerant C1 in the temperature increase circuit 32 is also increased by heat from the heating heater ECH2. The heating heater ECH2 is, for example, an electric heater (electric coolant heater). A black arrow Y5 shown in FIGS. 4 and 5 indicates transfer of heat from the heating heater ECH2 to a heater core 35.

The temperature of the refrigerant C1 in the temperature increase circuit 32 is increased by heat transferred from the heat pump circuit 31 to the temperature increase circuit 32 via the second heat exchanger 33 and the heat from the heating heater ECH2, and heat exchange is performed with conditioned air in the heater core 35 to heat the passenger compartment.

(Heating Mode)

(Battery-Heat Absorption Mode)

Figure 4:
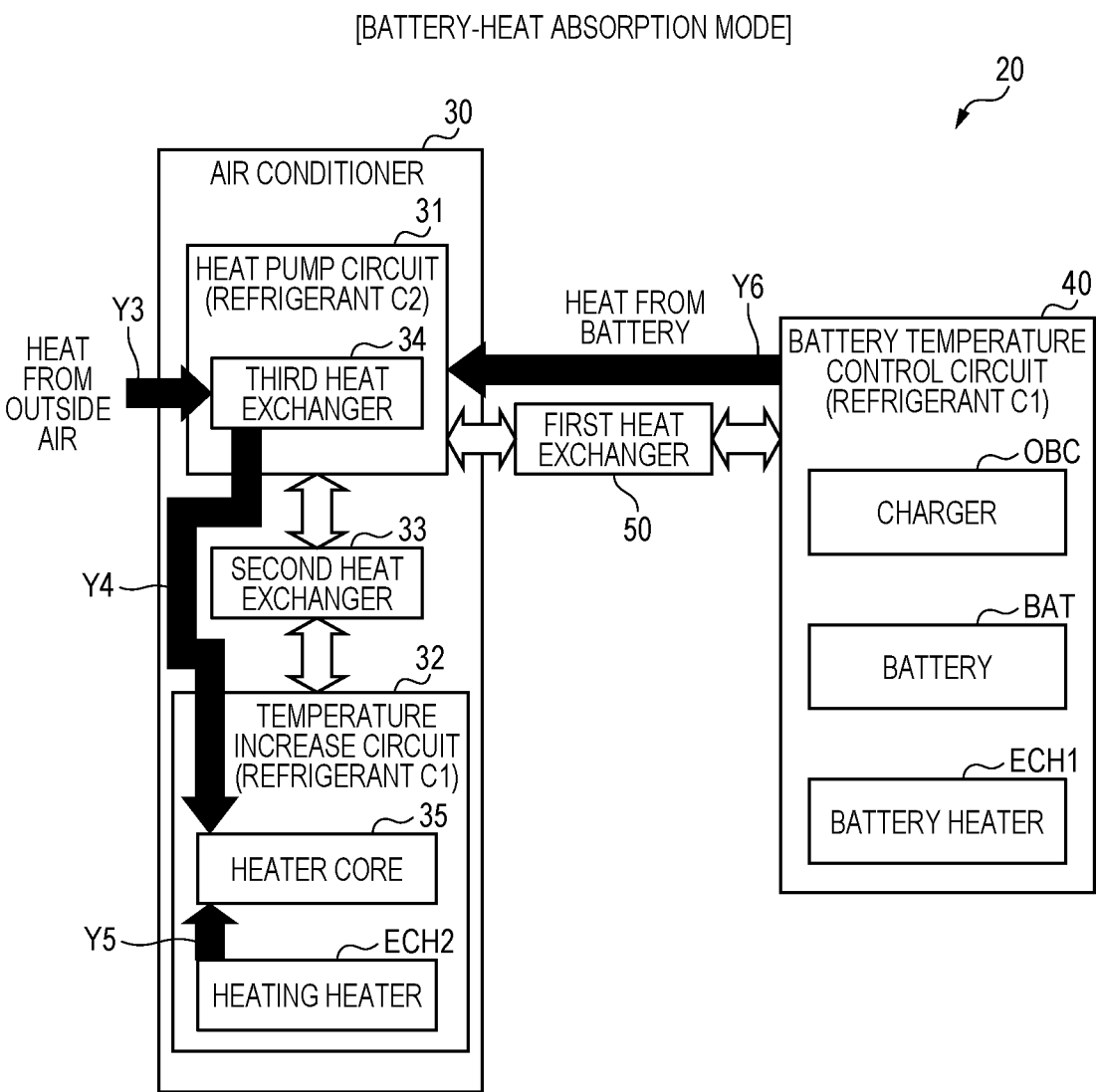
FIG. 4 is a diagram showing a flow of heat when heating the passenger compartment under a battery-heat absorption mode.

As described above, the first heat exchanger 50 enabling heat exchange between the refrigerant C1 and the refrigerant C2 is provided between the heat pump circuit 31 and the battery temperature control circuit 40. Therefore, the heat (arrow Y1 in FIG. 3) from the charger OBC during charge, the heat (arrow Y2 in FIG. 3) from the battery heater ECH1, and the heat (not shown) stored in the battery BAT by self-heat-generation of the battery BAT during charge are transmitted to the heat pump circuit 31 via the first heat exchanger 50. A black arrow Y6 shown in FIG. 4 indicates transfer of heat from the battery temperature control circuit 40 to the heat pump circuit 31. Then, the heat (arrow Y6 in FIG. 4) from the battery BAT is transmitted to the temperature increase circuit 32 via the second heat exchanger 33 together with the heat (arrow Y3 in FIG. 4) from the outside air, and the heat (arrow Y5 in FIG. 4) from the heating heater ECH2 is applied to heat the passenger compartment. That is, under this heating mode, the heat stored in the battery BAT is absorbed and used to heat the passenger compartment in addition to outside-air-heat absorption. Hereinafter, heat absorption from the battery BAT is also referred to as battery-heat absorption, and an operation mode under which heating of the passenger compartment is performed by battery-heat absorption is also referred to as a battery-heat absorption mode. FIG. 4 is a diagram showing a flow of heat under the battery-heat absorption mode.

(Outside-Air-Heat Absorption Mode)

Figures 5, 6:
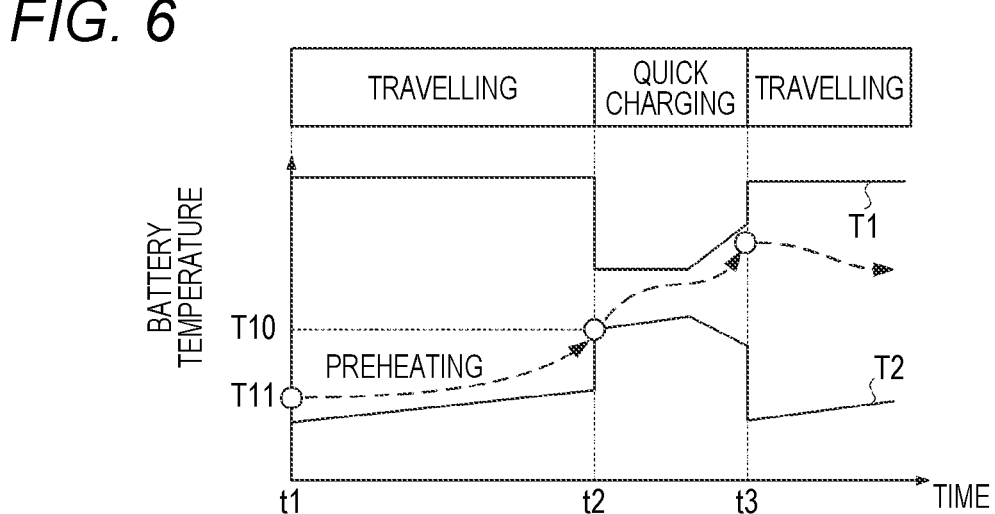
FIG. 5 is a diagram showing a flow of heat when heating the passenger compartment under an outside-air-heat absorption mode.
FIG. 6 is a diagram showing an example of temperature management of the battery BAT by a control device CTR.

On the other hand, an operation mode under which the passenger compartment is heated by absorbing heat from the outside air without using the heat stored in the battery BAT is also referred to as an outside-air-heat absorption mode. FIG. 5 is a diagram showing a flow of heat under the outside-air-heat absorption mode.

(Temperature Management of Battery)

In the battery BAT, an allowable value of power that may be input and output varies depending on a temperature. Therefore, the control device CTR manages the battery temperature Tbat such that the battery temperature Tbat falls within a temperature range in which input and output required for the battery BAT (hereinafter, also referred to as required input and output) along with traveling or charging of the vehicle V can be ensured. This will be described with reference to FIG. 6.

In an example shown in FIG. 6, the vehicle V is traveling at a time t1. The vehicle V is scheduled to quickly charge the battery BAT at the charging equipment between a time t2 and a time t3 after the time t1, and then travel again.

The temperature range in which the required input and output may be ensured is a temperature range between a high temperature side threshold value T1 and a low temperature side threshold value T2 according to a magnitude of the required input and output. Typically, when the required input and output is large (for example, during quick charging), the high temperature side threshold value T1 is small (in other words, low) and the low temperature side threshold value T2 is large (in other words, high) as compared with when the required input and output is small (for example, during traveling), so that the temperature range in which the required input and output may be ensured is narrowed.

In the example shown in FIG. 6, the low temperature side threshold value T2 at the start of the quick charging is T10, but the battery temperature Tbat at the time t1 is T11 lower than T10 (that is, T11<T10). That is, at the battery temperature Tbat as it is, even if the quick charging is started from the time t2, the battery temperature is low and the quick charging cannot be completed quickly.

In such a case, the control device CTR executes the preheating control for heating the battery BAT by the battery temperature control circuit 40 before the vehicle V arrives at the charging equipment. In the example shown in FIG. 6, by executing the preheating control from the time t1 to the time t2, before reaching the time t2, the control device CTR sets T10, which is the low temperature side threshold value T2 at the time, as a target temperature Ttar, and increases the temperature of the battery BAT to the target temperature (that is, T10). Even after that, the control device CTR manages the temperature of the battery BAT such that the battery temperature Tbat falls within the temperature range in which the required input and output may be ensured.

When the battery temperature Tbat is higher than a predetermined waste heat recovery temperature Theat, the control device CTR may also execute a control according to the battery-heat absorption mode described above, that is, a waste heat recovery control for enabling the air conditioner 30 to execute heating using waste heat of the battery BAT.

The waste heat recovery temperature Theat is set in advance by, for example, a manufacturer of the vehicle V.

Under the battery-heat absorption mode under which heat is absorbed from the battery BAT having a temperature higher than that of the outside air, it is possible to reduce an amount of power of the battery BAT consumed by the air conditioner 30 at the time of heating the passenger compartment, as compared with under the outside-air-heat absorption mode. That is, by executing the waste heat recovery control, it is possible to improve power consumption of the vehicle V.

On the other hand, when the waste heat recovery control is executed, the battery temperature Tbat may be decreased. Therefore, if the waste heat recovery control is executed after the preheating control, the battery temperature Tbat that is increased by the preheating control may be decreased, and it may be necessary to increase the temperature of the battery BAT again. In this way, when the battery temperature Tbat that is increased by the preheating control is decreased due to the waste heat recovery control and the temperature of the battery BAT is to be increased again, energy efficiency may be deteriorated.

Therefore, when a current battery temperature Tbat is higher than the waste heat recovery temperature Theat and the target temperature Ttar used for the preheating control is higher than the waste heat recovery temperature Theat, the control device CTR executes a process of executing the preheating control and restricting the execution of the waste heat recovery control. Accordingly, when the preheating control for increasing the temperature of the battery BAT to the target temperature Ttar higher than the waste heat recovery temperature Theat is executed, the control device CTR may prevent the waste heat recovery control from being executed even when an execution condition of the waste heat recovery control of "battery temperature Tbat>waste heat recovery temperature Theat" is satisfied.

Therefore, it is possible to prevent a situation in which the battery temperature Tbat is decreased due to the waste heat recovery control being executed on the battery BAT whose temperature is increased by the preheating control and in which it is necessary to increase the temperature of the battery BAT again. Accordingly, in the case of a temperature relationship in which the overall energy efficiency is decreased when both of the preheating control for shortening the charging time and the waste heat recovery control for improving the power consumption are executed, by prioritizing the preheating control and preventing the waste heat recovery control, it is possible to set the battery BAT to an appropriate temperature before the vehicle V arrives at the charging equipment while preventing the deterioration of the energy efficiency due to increasing the temperature of the battery BAT again. Therefore, it is possible to prevent an increase in the charging time of the battery BAT at the charging equipment and improve marketability of the vehicle V while improving the energy efficiency of the vehicle V. Here, the charging time is, for example, a time required to bring the battery BAT into a fully charged state.

By the way, when the execution of the waste heat recovery control is restricted, the power consumption of the vehicle V may be deteriorated. It is also assumed that the user desires to improve the power consumption rather than shorten the charging time at the charging equipment. If the execution of the waste heat recovery control is restricted against such an intention of the user, the marketability of the vehicle V may be decreased.

Therefore, when the current battery temperature Tbat is higher than the waste heat recovery temperature Theat and the target temperature Ttar used for the preheating control is higher than the waste heat recovery temperature Theat, the control device CTR may further execute a process of causing the user to select whether to execute the preheating control. When the user selects to execute the preheating control, the control device CTR may execute the preheating control and restrict the execution of the waste heat recovery control. On the other hand, when the user selects not to execute the preheating control, in other words, when the user rejects to execute the preheating control, the control device CTR may not execute the preheating control and may not restrict the execution of the waste heat recovery control. In this way, it is possible to provide a control desired by the user, and, for example, it is possible to prevent the execution, against an intention of the user, of the preheating control or the restriction of the execution of the waste heat recovery control.

(Selection Screen as to Whether to Execute Preheating Control)

Figure 7:
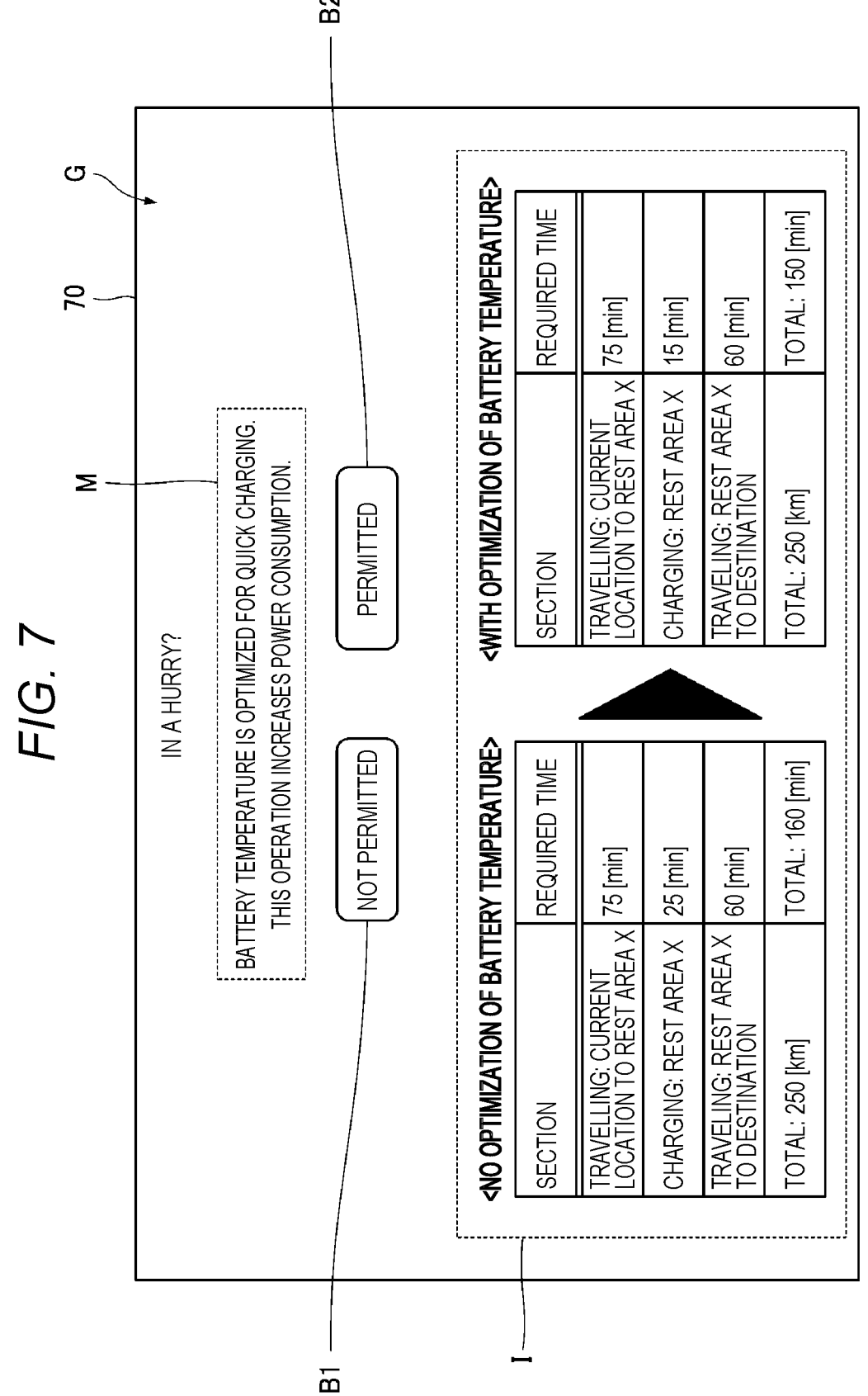
FIG. 7 is a diagram showing an example of a selection screen G for allowing a user to select whether to execute a preheating control.

For example, the control device CTR causes the HMI 70 to display the selection screen G shown in FIG. 7 at a predetermined timing, thereby causing the user to select whether to execute the preheating control via the selection screen G. Here, the predetermined timing may be, for example, a timing at which a distance to the charging equipment scheduled for charging or a required time is equal to or less than a predetermined value, that is, a timing at which the vehicle V approaches the charging equipment scheduled for charging to some extent.

As shown in FIG. 7, the selection screen G displays, for example, a message M for notifying the user that the preheating control is to be executed and that the power consumption may be deteriorated due to the execution of the preheating control. In an example shown in FIG. 7, a message such as "BATTERY TEMPERATURE IS OPTIMIZED FOR QUICK CHARGING. THIS OPERATION INCREASES POWER CONSUMPTION." is displayed as the message M.

In addition, on the selection screen G, for example, a waste heat recovery control selection button B1 for receiving a selection operation of not permitting the execution of the preheating control (that is, not restricting the execution of the waste heat recovery control) and a preheating control selection button B2 for receiving a selection operation of executing the preheating control are displayed. The user may instruct the control device CTR not to execute the preheating control and not to restrict the execution of the waste heat recovery control by operating (for example, tapping) the waste heat recovery control selection button B1. In addition, the user may instruct the control device CTR to execute the preheating control and restrict the execution of the waste heat recovery control by operating (for example, tapping) the preheating control selection button B2.

Further, the selection screen G may display estimated value information I including information indicating an estimated value of a charging time at the charging equipment scheduled for charging in each of the case where the preheating control is executed (that is, the case where the battery temperature Tbat is optimized) and the case where the preheating control is not executed (that is, the case where the battery temperature Tbat is not optimized).

In the example shown in FIG. 7, the estimated value information I including the information indicating that the estimated value of the charging time at the charging equipment of "rest area (service area) X" in the case where the preheating control is not executed (that is, the case where the battery temperature Tbat is not optimized) is 25 [min] and the estimated value of the charging time at the charging equipment of "rest area X" in the case where the preheating control is executed (that is, the case where the battery temperature Tbat is optimized) is 15 [min] is displayed.

Therefore, in the case of the example shown in FIG. 7, the user may select whether to execute the preheating control after understanding that an effect of shortening the charging time at the charging equipment of "rest area X" after the preheating control is executed is about 10 [min]. In this way, the control device CTR notifies the user of the estimated value of the charging time at the charging equipment before the vehicle V arrives at the charging equipment, so that it is possible for a user to take an action in consideration of the charging time at the charging equipment, and it is possible to improve convenience of the user. The control device CTR may derive the estimated value of the charging time at the charging equipment based on, for example, a predicted value of SOC of the battery BAT when the vehicle V arrives at the charging equipment scheduled for charging, or an output performance (for example, an upper limit output) of the charging equipment.

(Specific Example of Control by Control Device)

Next, a specific example of a control by the control device CTR will be described with reference to FIG. 8. As shown in FIG. 8, the control device CTR is configured to execute a control of six control patterns from a first control pattern N1 to a sixth control pattern N6. The control device CTR may execute the control of one of the above six control patterns based on a temperature relationship among the battery temperature Tbat, the target temperature Ttar of the preheating control, and the waste heat recovery temperature Theat.

The first control pattern N1 is a control pattern of a content of "executing the preheating control without performing the notification to the user". The notification to the user in the present example is a notification for causing the user to select whether to execute the preheating control, and may be, for example, the display of the selection screen G shown in FIG. 7.

As shown in FIG. 8, when the target temperature Ttar is higher than the waste heat recovery temperature Theat and the waste heat recovery temperature Theat is higher than the battery temperature Tbat (that is, target temperature Ttar>waste heat recovery temperature Theat>battery temperature Tbat), the control device CTR selects the first control pattern N1 and executes the control of the first control pattern N1.

More specifically, when the first control pattern N1 is selected, the control device CTR executes the preheating control without performing the notification (for example, the display of the selection screen G) to the user, increases the temperature of the battery BAT to the target temperature Ttar, and then maintains the target temperature Ttar until the vehicle V arrives at the charging equipment. Further, at this time, the control device CTR restricts the execution of the waste heat recovery control, and does not execute the waste heat recovery control even when the execution condition of the waste heat recovery control, which is "battery temperature Tbat>waste heat recovery temperature Theat", is satisfied.

The second control pattern N2 is a control pattern of a control content of "performing the notification to the user and executing a control according to a selection result of the user in response to the notification". As shown in FIG. 8, when the target temperature Ttar is higher than the battery temperature Tbat and the battery temperature Tbat is higher than the waste heat recovery temperature Theat (that is, target temperature Ttar>battery temperature Tbat>waste heat recovery temperature Theat), the control device CTR selects the second control pattern N2 and executes the control of the second control pattern N2.

More specifically, when the second control pattern N2 is selected, the control device CTR first performs the notification (for example, the display of the selection screen G) to the user. Then, when the user selects to execute the preheating control in response to the notification, the control device CTR executes the preheating control, increases the temperature of the battery BAT to the target temperature Ttar, and then maintains the target temperature Ttar until the vehicle V arrives at the charging equipment. Further, at this time, the control device CTR restricts the execution of the waste heat recovery control, and does not execute the waste heat recovery control even when the execution condition of the waste heat recovery control is satisfied. On the other hand, when the user selects not to execute the preheating control in response to the above notification, the control device CTR does not execute the preheating control and does not restrict the execution of the waste heat recovery control. Accordingly, in this case, the control device CTR appropriately executes the waste heat recovery control in accordance with the satisfaction of the execution condition of the waste heat recovery control.

The third control pattern N3 is a control pattern having a control content of "performing the notification to the user and executing a control according to a selection result of the user in response to the notification". As shown in FIG. 8, when the battery temperature Tbat is higher than the target temperature Ttar and the target temperature Ttar is higher than the waste heat recovery temperature Theat (that is, battery temperature Tbat>target temperature Ttar>waste heat recovery temperature Theat), the control device CTR selects the third control pattern N3 and executes the control of the third control pattern N3.

More specifically, when the third control pattern N3 is selected, the control device CTR first performs the notification (for example, the display of the selection screen G) to the user. Then, when the user selects to execute the preheating control in response to the notification, the control device CTR appropriately executes the preheating control every time the battery temperature Tbat falls below the target temperature Ttar, and maintains the battery BAT at the target temperature Ttar until the vehicle V arrives at the charging equipment. Further, at this time, the control device CTR restricts the execution of the waste heat recovery control, and does not execute the waste heat recovery control even when the execution condition of the waste heat recovery control is satisfied. On the other hand, when the user selects not to execute the preheating control in response to the above notification, the control device CTR does not execute the preheating control and does not restrict the execution of the waste heat recovery control. Accordingly, in this case, the control device CTR appropriately executes the waste heat recovery control in accordance with the satisfaction of the execution condition of the waste heat recovery control.

The fourth control pattern N4 is a control pattern having a control content of "executing the preheating control without performing the notification to the user". As shown in FIG. 8, when the waste heat recovery temperature Theat is higher than the target temperature Ttar and the target temperature Ttar is higher than the battery temperature Tbat (that is, waste heat recovery temperature Theat>target temperature Ttar>battery temperature Tbat), the control device CTR selects the fourth control pattern N4 and executes the control of the fourth control pattern N4.

More specifically, when the fourth control pattern N4 is selected, the control device CTR executes the preheating control without performing the notification (for example, the display of the selection screen G) to the user, increases the temperature of the battery BAT to the target temperature Ttar, and then maintains the target temperature Ttar until the vehicle V arrives at the charging equipment. At this time, the control device CTR maintains the battery BAT at the target temperature Ttar lower than the waste heat recovery temperature Theat, thereby preventing the satisfaction of the execution condition of the waste heat recovery control and not executing the waste heat recovery control.

The fifth control pattern N5 is a control pattern of a control content of "executing the preheating control without performing the notification to the user". As shown in FIG. 8, when the waste heat recovery temperature Theat is higher than the battery temperature Tbat and the battery temperature Tbat is higher than the target temperature Ttar (that is, waste heat recovery temperature Theat>battery temperature Tbat>target temperature Ttar), the control device CTR selects the fifth control pattern N5 and executes the control of the fifth control pattern N5.

More specifically, when the fifth control pattern N5 is selected, the control device CTR appropriately executes the preheating control every time the battery temperature Tbat falls below the target temperature Ttar and maintains the battery BAT at the target temperature Ttar until the vehicle V arrives at the charging equipment, without performing the notification (for example, the display of the selection screen G) to the user. At this time, the control device CTR maintains the battery BAT at the target temperature Ttar lower than the waste heat recovery temperature Theat, thereby preventing the satisfaction of the execution condition of the waste heat recovery control and not executing the waste heat recovery control.

The sixth control pattern N6 is a control pattern having a control content of "performing the notification to the user and executing a control according to a selection result of the user in response to the notification". As shown in FIG. 8, when the battery temperature Tbat is higher than the waste heat recovery temperature Theat and the waste heat recovery temperature Theat is higher than the target temperature Ttar (that is, battery temperature Tbat>waste heat recovery temperature Theat>target temperature Ttar), the control device CTR selects the sixth control pattern N6 and executes the control of the sixth control pattern N6.

More specifically, when the sixth control pattern N6 is selected, the control device CTR first performs the notification (for example, the display of the selection screen G) to the user. Then, when the user selects to execute the preheating control in response to the notification, the control device CTR first executes the waste heat recovery control. Then, when the battery temperature Tbat decreased by the waste heat recovery control falls below the target temperature Ttar, the control device CTR executes the preheating control, and maintains the battery BAT at the target temperature Ttar until the vehicle V arrives at the charging equipment. On the other hand, when the user selects not to execute the preheating control in response to the above notification, the control device CTR executes only the waste heat recovery control and does not execute the preheating control.

In this way, the control device CTR executes the control of one of the six control patterns from the first control pattern N1 to the sixth control pattern N6 based on the temperature relationship among the battery temperature Tbat, the target temperature Ttar of the preheating control, and the waste heat recovery temperature Theat. Accordingly, regardless of the temperature relationship among the battery temperature Tbat, the target temperature Ttar of the preheating control, and the waste heat recovery temperature Theat, the control device CTR may provide an appropriate control to the user.

For example, according to the second control pattern N2 and the third control pattern N3 that may be selected when the battery temperature Tbat is higher than the waste heat recovery temperature Theat and the target temperature Ttar is higher than the waste heat recovery temperature Theat, the user may select whether to execute the preheating control. Then, when the user selects to execute the preheating control, the preheating control may be executed, and the execution of the waste heat recovery control may be restricted. On the other hand, when the user rejects to execute the preheating control, it is possible to prevent the preheating control from being executed, and to prevent restricting the execution of the waste heat recovery control. That is, the user may select whether to prioritize shortening of the charging time at the charging equipment or to prioritize improvement of the power consumption. Therefore, it is possible to provide the control desired by the user (in other words, a control suitable for the convenience of the user), and for example, it is possible to prevent a situation in which the preheating control is not executed even though the user desires to shorten the charging time, or in which the execution of the waste heat recovery control is restricted even though the user desires to improve the power consumption.

According to the first control pattern N1, the fourth control pattern N4, and the fifth control pattern N5 that may be selected when the battery temperature Tbat is lower than the waste heat recovery temperature Theat, it is possible to execute the preheating control without performing the notification to the user. Accordingly, when the battery temperature Tbat is lower than the waste heat recovery temperature Theat and the execution condition of the waste heat recovery control is not satisfied, that is, when there is a possibility that the power consumption cannot be prioritized in the first place for the vehicle V, it is possible to execute the preheating control as it is without performing the notification to the user. Therefore, it is possible to prevent an excessive notification that may annoy or confuse the user.

According to the sixth control pattern N6 that may be selected when the battery temperature Tbat is higher than the waste heat recovery temperature Theat and the target temperature Ttar is lower than the waste heat recovery temperature Theat, the waste heat recovery control may be executed, and the preheating control may be executed after the waste heat recovery control. Accordingly, in the case of a temperature relationship in which the overall energy efficiency is not decreased even when both of the preheating control for shortening the charging time and the waste heat recovery control for improving the power consumption are executed, the waste heat recovery control is first executed, so that it is possible to improve the power consumption while bringing the battery temperature Tbat closer to the target temperature Ttar by the waste heat recovery control. After that, by executing the preheating control, the battery BAT may be set to an appropriate temperature before the vehicle V arrives at the charging equipment. Therefore, it is possible to achieve both the improvement of the power consumption and the shortening of the charging time, and the convenience of the user is improved.

According to the sixth control pattern N6, it is possible to cause the user to select whether to execute the preheating control. In a case where the user selects to execute the preheating control, the waste heat recovery control may be executed, and the preheating control may be executed after the waste heat recovery control. Accordingly, it is possible to execute the preheating control after the waste heat recovery control at a user's desire.

According to the sixth control pattern N6, it is possible to cause the user to select whether to execute the preheating control, and when the user rejects to execute the preheating control, the waste heat recovery control may be executed, and the execution of the preheating control may be prevented. Accordingly, it is possible to prevent the execution of the preheating control against an intention of the user.

(Example of Process Executed by Control Device)

Next, an example of a process executed by the control device CTR will be described with reference to FIG. 9. The control device CTR executes a series of processes shown in FIG. 9, for example, at a timing at which a distance to the charging equipment scheduled for charging or a required time is equal to or less than a predetermined value, that is, at a timing at which the vehicle V approaches the charging equipment scheduled for charging to some extent.

Figure 9:
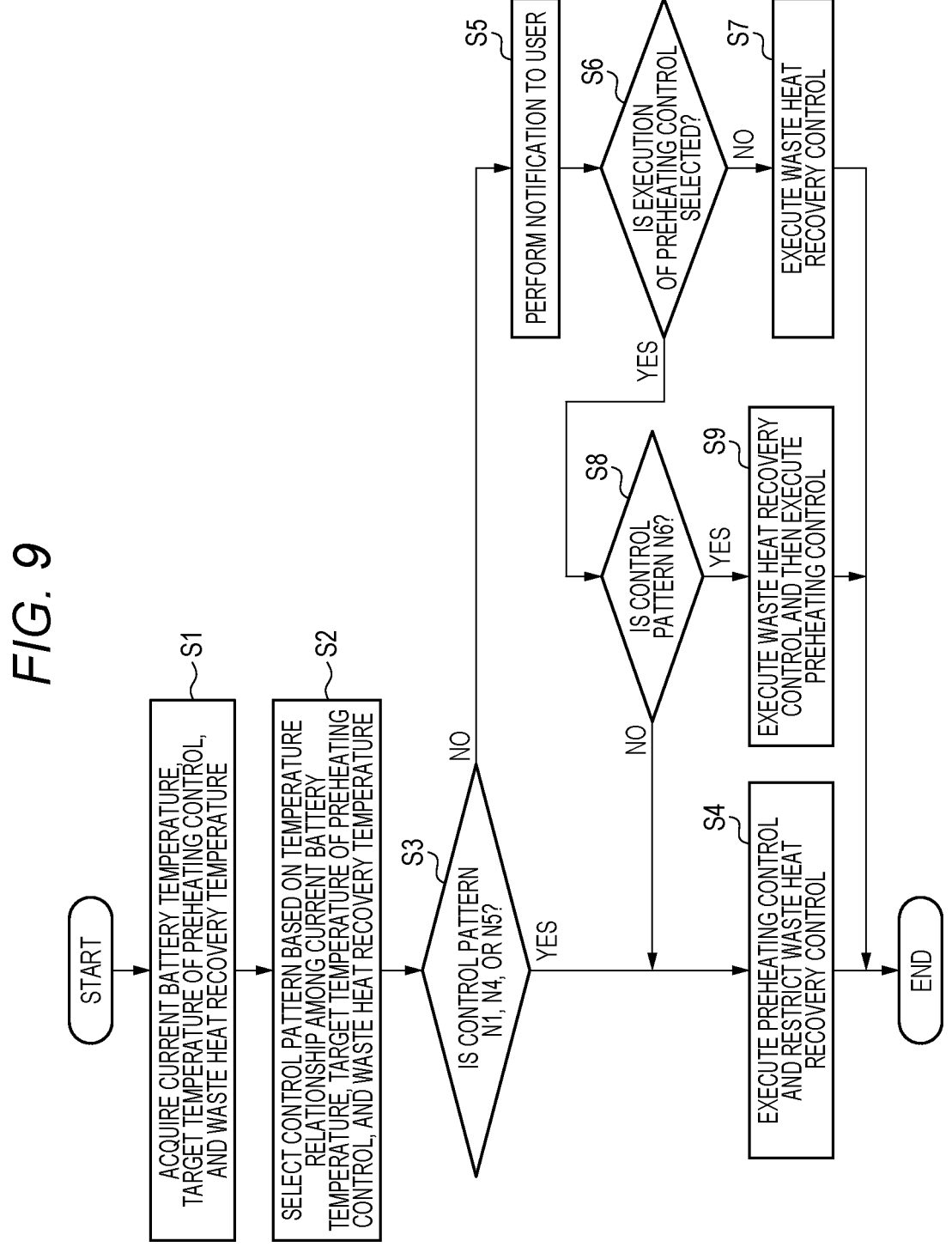
FIG. 9 is a flowchart showing an example of a process executed by the control device CTR.

As shown in FIG. 9, the control device CTR first acquires the current battery temperature Tbat, the target temperature Ttar of the preheating control, and the waste heat recovery temperature Theat (step S1). Then, the control device CTR selects one of the six control patterns from the first control pattern N1 to the sixth control pattern N6 based on a temperature relationship among the current battery temperature Tbat, the target temperature Ttar of the preheating control, and the waste heat recovery temperature Theat (step S2).

Next, the control device CTR determines whether the selected control pattern is the first control pattern N1, the fourth control pattern N4, or the fifth control pattern N5 (step S3). When it is determined that the selected control pattern is the first control pattern N1, the fourth control pattern N4, or the fifth control pattern N5 (step S3: YES), the control device CTR executes the preheating control without performing the notification to the user (for example, the display of the selection screen G), restricts the execution of the waste heat recovery control (step S4), and ends the series of processes shown in FIG. 9.

On the other hand, when it is determined that the selected control pattern is not the first control pattern N1, the fourth control pattern N4, or the fifth control pattern N5 (step S3: NO), the control device CTR performs the notification to the user (for example, the display of the selection screen G) (step S5). Then, the control device CTR determines whether the user selects to execute the preheating control in response to the notification performed by the process of step S5 (step S6).

When the user selects not to execute the preheating control (step S6: NO), in other words, when the user rejects to execute the preheating control, the control device CTR does not execute the preheating control, executes only the waste heat recovery control (step S7), and ends the series of processes shown in FIG. 9.

On the other hand, when the user selects to execute the preheating control (step S6: YES), the control device CTR determines whether the selected control pattern is the sixth control pattern N6 (step S8). Then, when it is determined that the selected control pattern is the sixth control pattern N6 (step S8: YES), the control device CTR executes the waste heat recovery control, executes the preheating control after the waste heat recovery control (step S9), and ends the series of processes shown in FIG. 9.

On the other hand, when it is determined that the selected control pattern is not the sixth control pattern N6 (step S8:

NO), the selected control pattern is the second control pattern N2 or the third control pattern N3, and thus the control device CTR proceeds to the process of step S4 described above to execute the preheating control, and ends the series of processes shown in FIG. 9.

As described above, according to the present embodiment, it is possible to prevent the increase in the charging time of the battery BAT at the charging equipment while improving the energy efficiency of the vehicle V.

Although an embodiment of the present invention has been described above with reference to the accompanying drawings, it is needless to say that the present invention is not limited to the embodiment described above. It is apparent that those skilled in the art can conceive of various modifications and changes within the scope described in the claims, and it is understood that such modifications and changes naturally fall within the technical scope of the present invention. In addition, the constituent elements in the embodiment described above may be freely combined without departing from the gist of the invention.

For example, the battery temperature control circuit 40 may be configured to allow the refrigerant C1 to perform heat exchange with the drive unit DU. During driving of the drive unit DU (for example, when the vehicle V travels), the drive unit DU has a high temperature. With such a configuration, the drive unit DU is cooled by the refrigerant C1, and the refrigerant C1 that receives heat from the drive unit DU is heated. The refrigerant C1 that receives the heat from the drive unit DU may supply the heat to the heat pump circuit 31 via the first heat exchanger 50. That is, during heating of the passenger compartment, the air conditioner 30 may also use the heat from the drive unit DU.

The battery temperature control circuit 40 may be connected to the temperature increase circuit 32 via an on-off valve. In this case, the passenger compartment may be heated by the refrigerant C1 flowing through the battery temperature control circuit 40 and the temperature increase circuit 32 through the on-off valve without passing through the first heat exchanger 50.

The refrigerant in the battery temperature control circuit 40 may be different from the refrigerant in the temperature increase circuit 32.

In the embodiment described above, an example in which the control device according to the present disclosure is implemented by the control device CTR mounted on the vehicle V has been described, but the present disclosure is not limited thereto. For example, the control device according to the present disclosure may be implemented by a server capable of communicating with the control device CTR. In this case, for example, each process of the control device CTR described above may be executed by a processing unit implemented by a CPU of the server or the like. The control device according to the present disclosure may be implemented by cooperation between the control device CTR and the server, and for example, a part of the processes of the control device CTR described above may be executed by the server.

The control method described in the embodiment described above may be implemented by executing a program prepared in advance on a computer. The program (control program) is stored in a computer-readable storage medium and is executed by being read from the storage medium. In addition, the program may be provided in a form stored in a nonvolatile (non-transitory) storage medium such as a flash memory, or may be provided via a network such as Internet. The computer that executes the program may be included in the vehicle V or may be included in an external device (for example, a server) capable of communicating with the vehicle V.

In the present specification and the like, at least the following matters are described. Although corresponding constituent elements in the embodiment described above are shown in parentheses, the present disclosure is not limited thereto.

(1) A control method of a vehicle (vehicle V), the vehicle including a battery (battery BAT), a heating device (battery temperature control circuit 40, battery heater ECH1) configured to heat the battery, and an air conditioner (air conditioner 30) configured to heat a passenger compartment using waste heat of the battery, the control method executed by a computer (control device CTR), to control the vehicle, configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and a waste heat recovery control for enabling, in response to a temperature of the battery reaching a predetermined waste heat recovery temperature, the air conditioner to execute heating using the waste heat of the battery, the control method including:

in response to a current temperature of the battery being higher than the waste heat recovery temperature and the target temperature being higher than the waste heat recovery temperature, executing the preheating control while restricting execution of the waste heat recovery control (step S4).

According to (1), when the preheating control for increasing a temperature of the battery to the target temperature higher than the waste heat recovery temperature is executed, the waste heat recovery control may be prevented from being executed even when an execution condition of the waste heat recovery control of "battery temperature>waste heat recovery temperature" is satisfied. Accordingly, it is possible to prevent a situation in which the temperature of the battery is decreased due to the waste heat recovery control being executed for the battery whose temperature is increased as a result of the preheating control and in which it is necessary to increase the temperature of the battery again. Accordingly, in the case of a temperature relationship in which the overall energy efficiency is decreased when both of the preheating control for shortening a charging time and the waste heat recovery control for improving power consumption are executed, by prioritizing the preheating control and preventing the waste heat recovery control, it is possible to set the battery to an appropriate temperature before the vehicle arrives at the charging equipment scheduled for charging while preventing deterioration of the energy efficiency due to increasing the temperature of the battery again. Therefore, it is possible to prevent an increase in the charging time of the battery at the charging equipment while improving the energy efficiency of the vehicle.

(2) The control method according to (1), further including:

allowing a user to select whether to execute the preheating control in response to the current temperature of the battery being higher than the waste heat recovery temperature and the target temperature being higher than the waste heat recovery temperature (step S5), and executing, in response to the user selecting to execute the preheating control, the preheating control while restricting the execution of the waste heat recovery control (step S4).

According to (2), in the case of the temperature relationship in which the overall energy efficiency is decreased when both of the preheating control for shortening the charging time and the waste heat recovery control for improving the power consumption are executed, the user may select whether to prioritize the shortening of the charging time at the charging equipment (preheating control) or the improvement of the power consumption (waste heat recovery control), and it is possible to provide a control desired by the user (in other words, a control suitable for convenience of the user).

(3) The control method according to (2), in which, in response to the user not selecting to execute the preheating control, the preheating control is not executed and the execution of the waste heat recovery control is not restricted (step S7).

According to (3), in the case of the temperature relationship in which the overall energy efficiency is decreased when both of the preheating control for shortening the charging time and the waste heat recovery control for improving the power consumption are executed, when the user is not in a hurry to complete charging, for example, in shopping or the like, and the improvement of the power consumption is prioritized over the shortening of the charging time at the charging equipment, since the preheating control is prevented and there are no restrictions on the waste heat recovery control, it is possible to execute the waste heat recovery control for improving the power consumption according to an intention of the user. In addition, since the preheating control is prevented, it is possible to reduce energy consumption due to the preheating control and to improve the power consumption.

(4) The control method according to (1), further including:

executing the preheating control without performing a notification to a user (step S4) in response to the current temperature of the battery being lower than the waste heat recovery temperature (step S3: YES).

According to (4), when the temperature of the battery is lower than the waste heat recovery temperature and the execution condition of the waste heat recovery control is not satisfied, that is, when there is a possibility that the power consumption cannot be prioritized in the first place for the vehicle, it is possible to execute the preheating control as it is without performing the notification to the user. Accordingly, it is possible to prevent an excessive notification that may annoy or confuse the user.

(5) The control method according to (1), further including:

executing the waste heat recovery control in response to the current temperature of the battery being higher than the waste heat recovery temperature and the target temperature being lower than the waste heat recovery temperature (step S8: YES), and executing the preheating control after the waste heat recovery control (step S9).

According to (5), in the case of a temperature relationship in which the overall energy efficiency is not decreased even when both of the preheating control for shortening the charging time and the waste heat recovery control for improving the power consumption are executed, the waste heat recovery control is first executed, so that it is possible to improve the power consumption while bringing the temperature of the battery closer to the target temperature by the waste heat recovery control. After that, by executing the preheating control, the battery may be set to an appropriate temperature before the vehicle arrives at the charging equipment. Therefore, it is possible to achieve both the improvement of the power consumption and the shortening of the charging time, and the convenience of the user is improved.

(6) The control method according to (5), further including:

allowing a user to select whether to execute the preheating control in response to the current temperature of the battery being higher than the waste heat recovery temperature and the target temperature being lower than the waste heat recovery temperature (step S5), and executing, in response to the user selecting to execute the preheating control, the waste heat recovery control and the preheating control after the waste heat recovery control (step S9).

According to (6), in the case of the temperature relationship in which the overall energy efficiency is not decreased even when both of the preheating control for shortening the charging time and the waste heat recovery control for improving the power consumption are executed, in a case where the user desires, it is possible to execute the preheating control after the waste heat recovery control.

(7) The control method according to (6), in which, in response to the user not selecting to execute the preheating control, the preheating control is not executed and the waste heat recovery control is prevented (step S7).

According to (7), in the case of the temperature relationship in which the overall energy efficiency is not decreased even when both of the preheating control for shortening the charging time and the waste heat recovery control for improving the power consumption are executed, in a case where the user is, for example shopping or the like and is not in a hurry to complete charging therefor, and does not desire the shortening of the charging time at the charging equipment, the energy consumption due to the preheating control may be reduced by preventing the preheating control, and the power consumption may be improved.

(8) The control method according to any one of (1) to (3) and (5) to (7), further including:

in a case where the battery is scheduled to be charged at the charging equipment, notifying, before the vehicle arrives at the charging equipment, a user of an estimated value of a charging time of the battery at the charging equipment (step S5).

According to (8), it is possible for the user to take an action in consideration of the charging time at the charging equipment scheduled for charging, and it is possible to improve the convenience of the user.

(9) A control device for controlling a vehicle, the vehicle including a battery, a heating device configured to heat the battery, and an air conditioner configured to heat a passenger compartment using waste heat of the battery, in which the control device is configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and execute a waste heat recovery control for enabling, in response to a temperature of the battery reaching a predetermined waste heat recovery temperature, the air conditioner to execute heating using the waste heat of the battery, and, in response to a current temperature of the battery being higher than the waste heat recovery temperature and the target temperature being higher than the waste heat recovery temperature, the control device executes the preheating control while restricting execution of the waste heat recovery control.

According to (9), when the preheating control for increasing a temperature of the battery to the target temperature higher than the waste heat recovery temperature is executed, the waste heat recovery control may be prevented from being executed even if an execution condition of the waste heat recovery control of "battery temperature>waste heat recovery temperature" is satisfied. Accordingly, it is possible to prevent a situation in which the temperature of the battery is decreased due to the waste heat recovery control being executed for the battery whose temperature is increased as a result of the preheating control and in which it is necessary to increase the temperature of the battery again. Accordingly, in the case of a temperature relationship in which the overall energy efficiency is decreased when both of the preheating control for shortening a charging time and the waste heat recovery control for improving power consumption are executed, by prioritizing the preheating control and preventing the waste heat recovery control, it is possible to set the battery to an appropriate temperature before the vehicle arrives at the charging equipment scheduled for charging while preventing deterioration of the energy efficiency due to increasing the temperature of the battery again. Therefore, it is possible to prevent an increase in the charging time of the battery at the charging equipment while improving the energy efficiency of the vehicle.

(10) A vehicle including:

a battery;

a heating device configured to heat the battery;

an air conditioner configured to heat a passenger compartment using waste heat of the battery; and a control device configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and execute a waste heat recovery control for enabling, in a response to a temperature of the battery reaching a predetermined waste heat recovery temperature, the air conditioner to execute heating using the waste heat of the battery, in which, in response to a current temperature of the battery being higher than the waste heat recovery temperature and the target temperature being higher than the waste heat recovery temperature, the control device executes the preheating control while restricting execution of the waste heat recovery control.

According to (10), when the preheating control for increasing a temperature of the battery to the target temperature higher than the waste heat recovery temperature is executed, the waste heat recovery control may be prevented from being executed even if an execution condition of the waste heat recovery control of "battery temperature>waste heat recovery temperature" is satisfied. Accordingly, it is possible to prevent a situation in which the temperature of the battery is decreased due to the waste heat recovery control being executed for the battery whose temperature is increased as a result of the preheating control and in which it is necessary to increase the temperature of the battery again. Accordingly, in the case of a temperature relationship in which the overall energy efficiency is decreased when both of the preheating control for shortening a charging time and the waste heat recovery control for improving power consumption are executed, by prioritizing the preheating control and preventing the waste heat recovery control, it is possible to set the battery to an appropriate temperature before the vehicle arrives at the charging equipment scheduled for charging while preventing deterioration of the energy efficiency due to increasing the temperature of the battery again. Therefore, it is possible to prevent an increase in the charging time of the battery at the charging equipment while improving the energy efficiency of the vehicle.

What is claimed is:

1. A control method of a vehicle, the vehicle including a battery, a heating device configured to heat the battery, and an air conditioner configured to heat a passenger compartment using waste heat of the battery, the control method executed by a computer, to control the vehicle, configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and a waste heat recovery control for enabling, in response to a temperature of the battery reaching a predetermined waste heat recovery temperature, the air conditioner to execute heating using the waste heat of the battery, the control method comprising:

in response to a current temperature of the battery being higher than the waste heat recovery temperature and the target temperature being higher than the waste heat recovery temperature, determining that executing the preheating control while restricting execution of the waste heat recovery control is possible;

allowing a user to select whether to execute the preheating control in response to the current temperature of the battery being higher than the waste heat recovery temperature and the target temperature being higher than the waste heat recovery temperature; and executing, in response to the user selecting to execute the preheating control, the preheating control while restricting the execution of the waste heat recovery control.

2. The control method according to claim 1, wherein, in response to the user not selecting to execute the preheating control, the preheating control is not executed and the execution of the waste heat recovery control is not restricted.

3. The control method according to claim 1, further comprising:

executing the preheating control without performing a notification to a user in response to the current temperature of the battery being lower than the waste heat recovery temperature.

4. The control method according to claim 1, further comprising:

executing the waste heat recovery control in response to the current temperature of the battery being higher than the waste heat recovery temperature and the target temperature being lower than the waste heat recovery temperature, and executing the preheating control after the waste heat recovery control.

5. The control method according to claim 4, further comprising:

allowing a user to select whether to execute the preheating control in response to the current temperature of the battery being higher than the waste heat recovery temperature and the target temperature being lower than the waste heat recovery temperature, and executing, in response to the user selecting to execute the preheating control, the waste heat recovery control and the preheating control after the waste heat recovery control.

6. The control method according to claim 5, wherein, in response to the user not selecting to execute the preheating control, the preheating control is not executed and the waste heat recovery control is prevented.

7. The control method according to claim 1, further comprising:

in a case where the battery is scheduled to be charged at the charging equipment, notifying, before the vehicle arrives at the charging equipment, a user of an estimated value of a charging time of the battery at the charging equipment.

8. The control method according to claim 1, further comprising:

determining a relationship among the current temperature of the battery, the waste heat recovery temperature, and the target temperature.

9. A control device for controlling a vehicle, the vehicle including a battery, a heating device configured to heat the battery, and an air conditioner configured to heat a passenger compartment using waste heat of the battery, wherein the control device is configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and execute a waste heat recovery control for enabling, in response to a temperature of the battery reaching a predetermined waste heat recovery temperature, the air conditioner to execute heating using the waste heat of the battery, in response to a current temperature of the battery being higher than the waste heat recovery temperature and the target temperature being higher than the waste heat recovery temperature, determining that the control device executes the preheating control while restricting execution of the waste heat recovery control is possible, the control device allows a user to select whether to execute the preheating control in response to the current temperature of the battery being higher than the waste heat recovery temperature and the target temperature being higher than the waste heat recovery temperature, and the control device executes, in response to the user selecting to execute the preheating control, the preheating control while restricting the execution of the waste heat recovery control.

10. A vehicle comprising:

a battery;

a heating device configured to heat the battery;

an air conditioner configured to heat a passenger compartment using waste heat of the battery; and a control device configured to execute a preheating control for heating, in a case where the battery is scheduled to be charged at charging equipment included in a scheduled travel route of the vehicle, the battery by the heating device before the vehicle arrives at the charging equipment such that a temperature of the battery when the vehicle arrives at the charging equipment reaches a predetermined target temperature, and execute a waste heat recovery control for enabling, in a response to a temperature of the battery reaching a predetermined waste heat recovery temperature, the air conditioner to execute heating using the waste heat of the battery, wherein, in response to a current temperature of the battery being higher than the waste heat recovery temperature and the target temperature being higher than the waste heat recovery temperature, determining that the control device executes the preheating control while restricting execution of the waste heat recovery control is possible, the control device allows a user to select whether to execute the preheating control in response to the current temperature of the battery being higher than the waste heat recovery temperature and the target temperature being higher than the waste heat recovery temperature, and the control device executes, in response to the user selecting to execute the preheating control, the preheating control while restricting the execution of the waste heat recovery control.

* * * * *